(12) United States Patent
Zhang et al.

(10) Patent No.: US 12,513,624 B2
(45) Date of Patent: Dec. 30, 2025

(54) SYSTEMS, METHODS, AND DEVICES FOR POWER CONTROL AND BEAM SELECTION IN MIXED TRAFFIC

(71) Applicant: Apple Inc., Cupertino, CA (US)

(72) Inventors: Yushu Zhang, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Sigen Ye, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/773,864

(22) PCT Filed: Aug. 6, 2021

(86) PCT No.: PCT/CN2021/111150
§ 371 (c)(1),
(2) Date: May 3, 2022

(87) PCT Pub. No.: WO2023/010515
PCT Pub. Date: Feb. 9, 2023

(65) Prior Publication Data
US 2024/0179633 A1 May 30, 2024

(51) Int. Cl.
*H04W 52/14* (2009.01)
*H04W 52/36* (2009.01)

(52) U.S. Cl.
CPC ....... *H04W 52/146* (2013.01); *H04W 52/365* (2013.01)

(58) Field of Classification Search
CPC ............. H04W 52/146; H04W 52/365; H04W 52/262; H04W 52/42
See application file for complete search history.

(56) References Cited

U.S. PATENT DOCUMENTS

2017/0142667 A1* 5/2017 Takeda ................. H04W 52/34
2019/0261280 A1 8/2019 Jung
(Continued)

FOREIGN PATENT DOCUMENTS

CN 110809321 A 2/2020
CN 111345076 A 6/2020
(Continued)

OTHER PUBLICATIONS

3rd Generation Partnership Project; Technical Specification Group Radio Access Network; NR; Multiplexing and channel coding (Release 16); 3GPP TS 38.212 V16.6.0 (Jun. 2021).
(Continued)

*Primary Examiner* — Angelica Perez
(74) *Attorney, Agent, or Firm* — Eschweiler & Potashnik, LLC; Matthew Glause

(57) ABSTRACT

Techniques, described herein, include solutions for enabling PC parameters and beam selection regarding mixed traffic, including a PC parameter set selection based on unified transmission configuration indicator (TCI) states, reporting power headroom (PHR) based on PC parameter sets, and beam selection based on traffic types associated with different TCI states.

18 Claims, 11 Drawing Sheets

(56) References Cited

U.S. PATENT DOCUMENTS

| | | | |
|---|---|---|---|
| 2019/0261281 A1 | 8/2019 | Jung et al. | |
| 2021/0037481 A1* | 2/2021 | Kim | H04W 52/365 |
| 2021/0045070 A1* | 2/2021 | Yi | H04W 76/27 |
| 2021/0105727 A1 | 4/2021 | Xu | |
| 2021/0121927 A1 | 4/2021 | Kirch | |
| 2021/0153209 A1 | 5/2021 | Guan et al. | |
| 2022/0061056 A1* | 2/2022 | Farag | H04B 7/0695 |
| 2022/0201619 A1* | 6/2022 | Yao | H04W 52/146 |
| 2022/0210748 A1* | 6/2022 | Huang | H04W 52/365 |
| 2022/0217643 A1* | 7/2022 | Zhou | H04W 52/42 |
| 2022/0304015 A1* | 9/2022 | Yi | H04W 24/08 |
| 2022/0393827 A1* | 12/2022 | Chen | H04L 5/0051 |
| 2023/0059644 A1* | 2/2023 | Yuan | H04W 52/42 |
| 2023/0239806 A1* | 7/2023 | Määttänen | H04W 52/04 370/329 |
| 2023/0397193 A1* | 12/2023 | Liu | H04L 5/0044 |
| 2024/0007970 A1* | 1/2024 | Yuan | H04W 52/367 |
| 2024/0049143 A1 | 2/2024 | Yuan | |
| 2024/0064649 A1* | 2/2024 | Go | H04L 5/0094 |
| 2024/0171327 A1* | 5/2024 | Yang | H04W 72/0453 |
| 2024/0267901 A1* | 8/2024 | Chen | H04L 5/0023 |
| 2024/0373372 A1* | 11/2024 | Gao | H04W 52/54 |

FOREIGN PATENT DOCUMENTS

| | | | |
|---|---|---|---|
| CN | 111656841 A | 9/2020 | |
| EP | 4287537 A1 | 12/2023 | |
| JP | 2020-519150 A | 6/2020 | |
| JP | 2021-514563 A | 6/2021 | |
| JP | 2021-522753 A | 8/2021 | |
| JP | 2021-534630 A | 12/2021 | |
| WO | WO-2019192538 A1 * | 10/2019 | ............ H04W 24/08 |
| WO | 2019/214649 A1 | 11/2019 | |
| WO | 2020/030038 A1 | 2/2020 | |
| WO | 2020143018 A1 | 7/2020 | |
| WO | 2021093177 A1 | 5/2021 | |
| WO | 2021127582 A | 6/2021 | |

OTHER PUBLICATIONS

3rd Generation Partnership Project; Technical Specification Group Radio Access Network; NR; Physical layer procedures for control (Release 16); 3GPP TS 38.213 V16.6.0 (Jun. 2021).

3rd Generation Partnership Project; Technical Specification Group Radio Access Network; NR; Physical layer procedures for data (Release 16); 3GPP TS 38.214 V16.6.0 (Jun. 2021).

3rd Generation Partnership Project; Technical Specification Group Radio Access Network; NR; Medium Access Control (MAC) protocol specification (Release 16); 3GPP TS 38.321 V16.5.0 (Jun. 2021).

3rd Generation Partnership Project; Technical Specification Group Radio Access Network; NR; Radio Resource Control (RRC) protocol specification (Release 16); 3GPP TS 38.331 V16.5.0 (Jun. 2021).

3rd Generation Partnership Project; Technical Specification Group Radio Access Network; NR; Multiplexing and channel coding; (Release 16); 3GPP TS 38.212 V16.6.0 (Jun. 2021); http://www.3gpp.org.

3rd Generation Partnership Project; Technical Specification Group Radio Access Network; NR; Physical layer procedures for control; (Release 16); 3GPP TS 38.213 V16.6.0 (Jun. 2021); http://www.3gpp.org.

3rd Generation Partnership Project; Technical Specification Group Radio Access Network; NR; Physical layer procedures for data; (Release 16); 3GPP TS 38.214 V16.6.0 (Jun. 2021); http://www.3gpp.org.

3rd Generation Partnership Project; Technical Specification Group Radio Access Network; NR; Medium Access Control (MAC) protocol specification; (Release 16); 3GPP TS 38.321 V16.5.0 (Jun. 2021); http://www.3gpp.org.

3rd Generation Partnership Project; Technical Specification Group Radio Access Network; NR; Radio Resource Control (RRC) protocol specification; (Release 16); 3GPP TS 38.331 V16.5.0 (Jun. 2021); http://www.3gpp.org.

International Preliminary Report on Patentability dated Feb. 6, 2024 in connection with PCT Application No. PCT/CN2021/111150.

PCT Search Report and Written Opinion dated Mar. 31, 2022 in connection with PCT Application No. PCT/CN2021/111150.

ZTE "Enhancements on multi-beam operation" 3GPP TSG RAN WG1; Meeting #105-e; R1-2104585; May 11, 2021.

Nokia, Nokia Shanghai Bell; "Enhancements on Multi-beam Operation"; 3GPP TSG RAN WG1 #104-bis-e; R1-2103365; Apr. 12, 2021.

European Extended Search Report dated Mar. 7, 2025 in connection with Application No. 21952390.9.

Apple Inc; "On Multi-TRP Reliability Enhancement"; 3GPP TSG-RAN WG1 Meeting #105-e; R1-2105088; May 12, 2021.

* cited by examiner

FIG. 3

| CORESET POOL ID | SERVING CELL ID | | | | | | BWP ID | |
|---|---|---|---|---|---|---|---|---|
| T7 | T6 | T5 | T4 | T3 | T2 | T1 | T0 | OCT 1 |
| T16 | T15 | T14 | T13 | T11 | T10 | T9 | T8 | OCT 2 |
| ⋮ | | | | | | | | OCT 3 |
| T(N−2)*8+7 | T(N−2)*8+6 | T(N−2)*8+5 | T(N−2)*8+4 | T(N−2)*8+3 | T(N−2)*8+2 | T(N−2)*8+1 | T(N−2)*8 | OCT N |
| S7 | S6 | S5 | S4 | S3 | S2 | S1 | S0 | OCT N+1 |

300

SYSTEMS, METHODS, AND DEVICES FOR POWER CONTROL AND BEAM SELECTION IN MIXED TRAFFIC

This application is a National Phase entry application of International Patent Application No. PCT/CN2021/111150 filed Aug. 6, 2021, entitled "SYSTEMS, METHODS, AND DEVICES FOR POWER CONTROL AND BEAM SELECTION IN MIXED TRAFFIC", the contents of which are herein incorporated by reference in their entirety.

FIELD

This disclosure relates to wireless communication networks including techniques for power and transmission management.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how wireless devices (e.g., user equipment (UE)) send and receive information, including the power devices manage resources such as power and beams for doing the same.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 3 is a diagram of an example of a media access control (MAC) control element (CE) comprising transmission configuration indicator (TCI) states and a bitmap of PC parameter sets.

DETAILED DESCRIPTION

Figure 1:
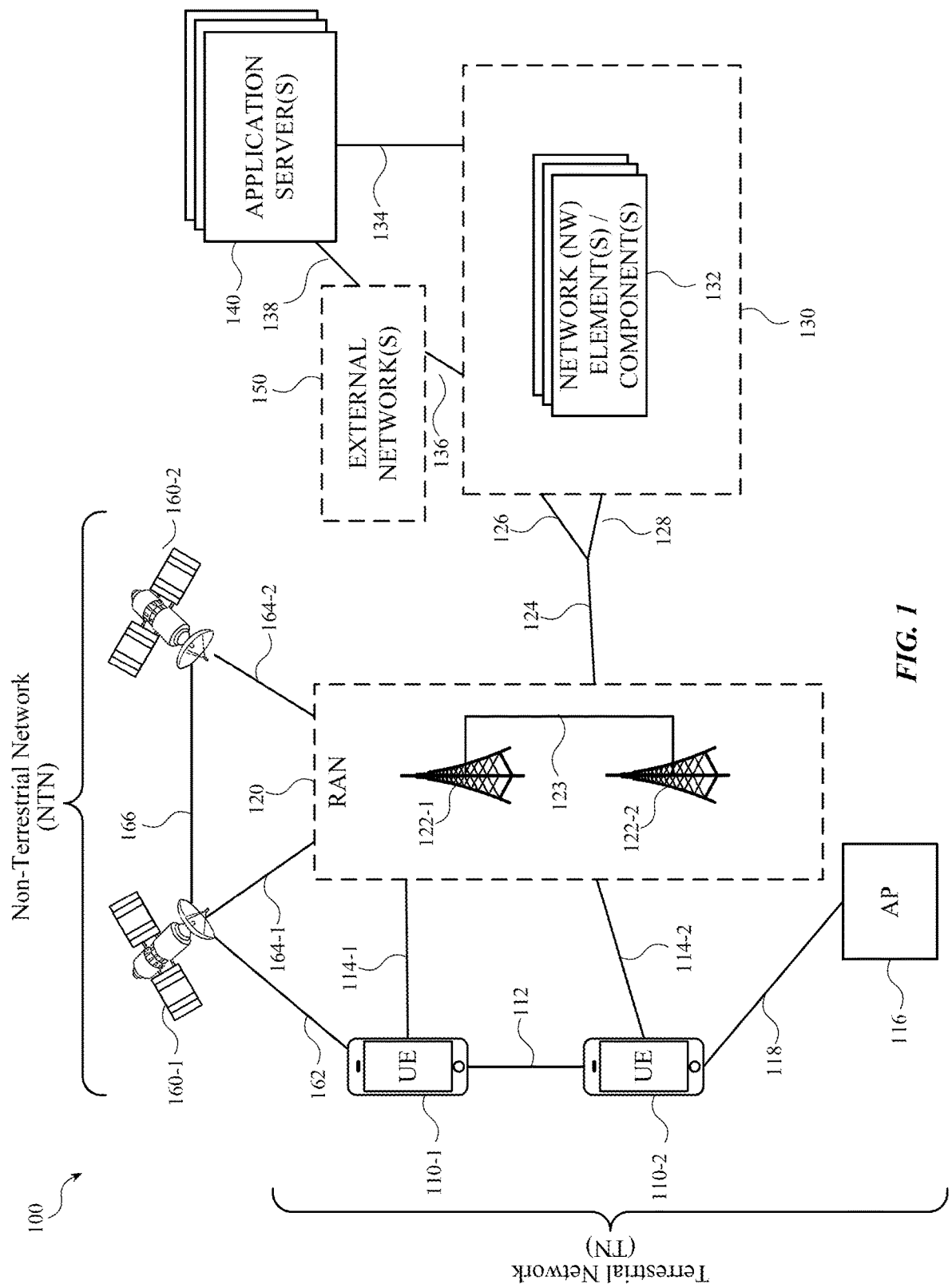
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include user equipment (UEs) capable of communicating with base stations and other network nodes. Base station may use one or more power control (PC) parameters (e.g., P0, alpha, closed loop power control process index (CL-PI)), and pathloss reference signal (PL-RS), associated with or included in, an uplink or joint unified transmission configuration indicator (TCI). The PL-RS may be mandatorily associated with an uplink/joint TCI. Other PC parameters may be optionally associated with an uplink/joint TCI; if not configured, a default PC parameter set can be applied. Also, an uplink TCI may be used to provide beam indication for uplink channel only; and a joint TCI may be used to a provide beam indication for both an uplink and a downlink channel.

Power headroom (PHR) may be measured and reported based on a certain PC parameter set. An actual PHR may be calculated based on the PC parameter set applied for a physical uplink shared channel (PUSCH) or sounding reference signal (SRS) transmission; a virtual PHR (reference PHR) may be calculated based on a default PC parameter set; and a virtual PHR may be selected when there is no actual PUSCH/SRS transmission. Regarding potentially different power backoff for different beams due to emission safety, a UE may report a beam specific virtual PHR, where the maximum transmission power (Pcmax) may consider the power backoff. The beam selection may consider the power backoff status and the coupling loss for each beam. If an uplink transmission may hit the Pcmax, the virtual PHR may be used for uplink beam selection. Otherwise, a coupling loss (downlink Reference Signal Received Power (RSRP)) may be used for uplink beam selection. Additionally, a UE may be with a mixed type of traffic, e.g., enhanced Mobile BroadBand (eMBB), or ultra-reliable low-latency communication (URLLC), or extended reality (XR). Also, different types of traffic may have different performance requirements, e.g., URLLC may require a lower block error ratio (BLER) than eMBB. Techniques, described herein, may include solutions for enabling PC parameters and beam selection with regard to mixed traffic, including a PC parameter set selection based on a unified transmission configuration indicator (TCI), reporting power headroom (PHR) based on PC parameter sets, and beam selection based on traffic types associated with different TCI states. As described herein, unified TCI may include TCI signaling that provides a TCI framework for uplink TCI (for beam indication for uplink channel only) and joint TCI (for beam indication for both uplink and downlink channels). For example, as described in greater detail below with reference to the figures, a UE may receive PC parameter sets associated with different TCI states, and the different TCI states may be associated with different types of uplink transmissions (e.g., PHR reporting, eMMB transmissions, URLCC transmissions, etc.), thereby enabling the UE to apply different PC parameter sets pursuant to varying nature of different types of uplink transmission.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
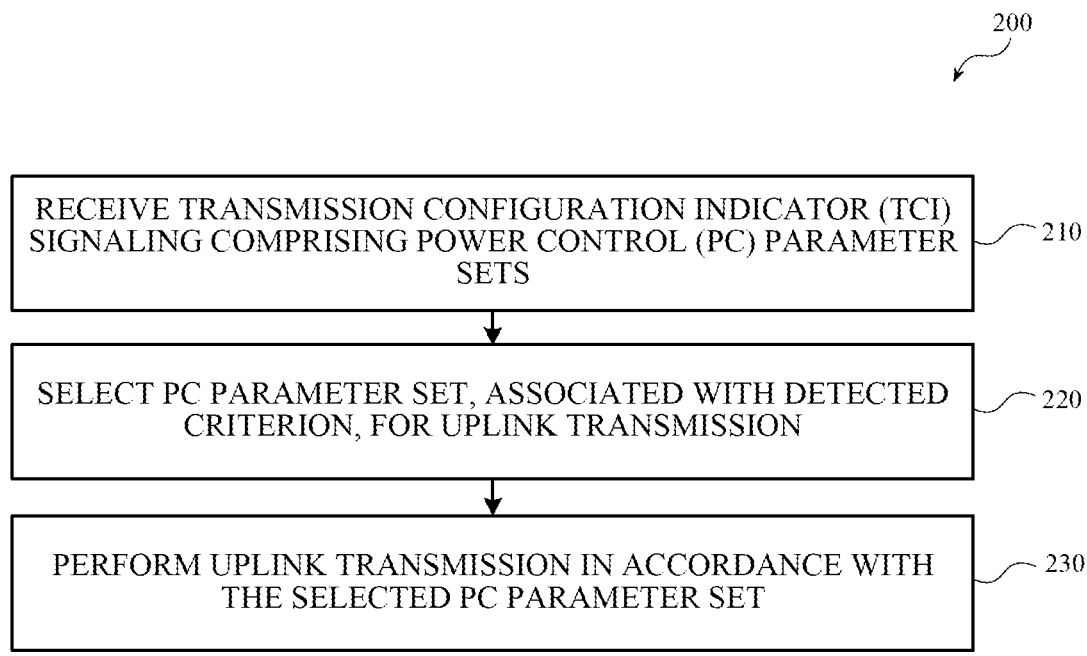
FIG. 2 is a diagram of an example of a process for performing uplink transmissions in accordance with a selected power control (PC) parameter set.

FIG. 2 is a diagram of an example of a process for performing uplink transmissions in accordance with a selected PC parameter set. Process 200 may be implemented by user equipment (UE). In some implementations, some or all of process 200 may be performed by one or more other systems or devices, including one or more of the devices of FIG. 1, such as base station 122. Additionally, process 200 may include one or more fewer, additional, differently ordered and/or arranged operations than those shown in FIG. 2. In some implementations, some or all of the operations of process 200 may be performed independently, successively, simultaneously, etc., of one or more of the other operations of process 200. As such, the techniques described herein are not limited to a number, sequence, arrangement, timing, etc., of the operations or process depicted in FIG. 2. Additionally, while process 200 may be primarily described from the perspective a particular device (e.g., UE 110), the techniques described herein also include corresponding operations performed by a corresponding device (e.g., base station 122).

A shown, process 200 may include receiving TCI signaling comprising PC parameter sets (block 210). For example, UE 110 may receive TCI signaling from base station 122. The TCI signaling may including a plurality of PC parameter sets or groups. Each PC parameter set may include one or more PC parameters, such as a P0 parameter, alpha parameter, closed loop parameter, CL-IL, a PL-RS parameter, etc. In some implementations, each PC parameter set may be associated with a set index or identifier representing the PC parameter set. Additionally, or alternatively, each PC parameter set may be associated with, or included in, an uplink or joint unified TCI or TCI state. In some implementations, the PC parameter sets may be configured and/or updated by RRC signaling and/or another type of higher layer signaling from base station 122.

Process 200 may include selecting a PC parameter set, associated with a detected criterion, for an uplink transmission (block 220). For example, UE 110 may be configured to select a PC parameter set, for an uplink transmission, in response to detecting a given criterion, condition, trigger, etc. In some implementations, the criterion may include one or more of receiving a MAC CE specifying a PC parameter set, receiving DCI specifying a PC parameter set, and/or using a PUCCH resource (and/or PUCCH resource group) associated with a particular PC parameter set. Additionally, or alternatively, the criterion may include one or more of performing a virtual PHR procedure or calculation associated with one or more PC parameter sets, transmitting (or preparing to transmit) a type of traffic associated with a particular PC parameter set, etc. In some implementations, the PC parameter set, associated with a detected criterion, may be a set of specified PC parameters, while in some implementations, the PC parameter set may be a set of default of PC parameters.

Process 200 may include performing the uplink transmission in accordance with the selected PC parameter set (block 230). For example, upon selecting a PC parameter set associated with a detected criterion, condition, trigger, etc., UE 110 may proceed to transmit the uplink information in accordance with the PC parameters. As such, the PC used in transmitting the information may be modified or customized by the PC parameter set designated for the transmission.

FIG. 3 is a diagram of an example of a MAC CE 300 comprising TCI states and a bitmap of PC parameter sets. In some implementations, base station 122 may configure N (where N is greater than or equal to 1, e.g., N=2) PC parameter sets for a unified uplink/joint TCI state via RRC signaling. In some implementations, this may include base station 122 sending MAC CE 400 to UE 110. As shown, MAC CE 300 may be arranged in octets (e.g., OCT 1, OCT 2, etc.). A first octet may include a CORESET pool identifier (ID) a serving cell ID, and a bandwidth part (BWP) ID. Subsequent octets (e.g., OCT 2-OCT N) may include TCI state IDs (e.g., T0, T1, T2, . . . T(N−2)*8+7). MAC CE 300 may also include a bitmap (e.g., in a subsequent octet (e.g., OCT N+1)) that indicates PC parameter indexes or IDs (e.g., S0, S1, etc.) that correspond to different PC parameter sets. Thus, a subsequent MAC CE may identify the PC parameter set (e.g., S0, S1, etc.) for a TCI (e.g., T0, T1, T2, etc.) to be activated.

Figure 4:
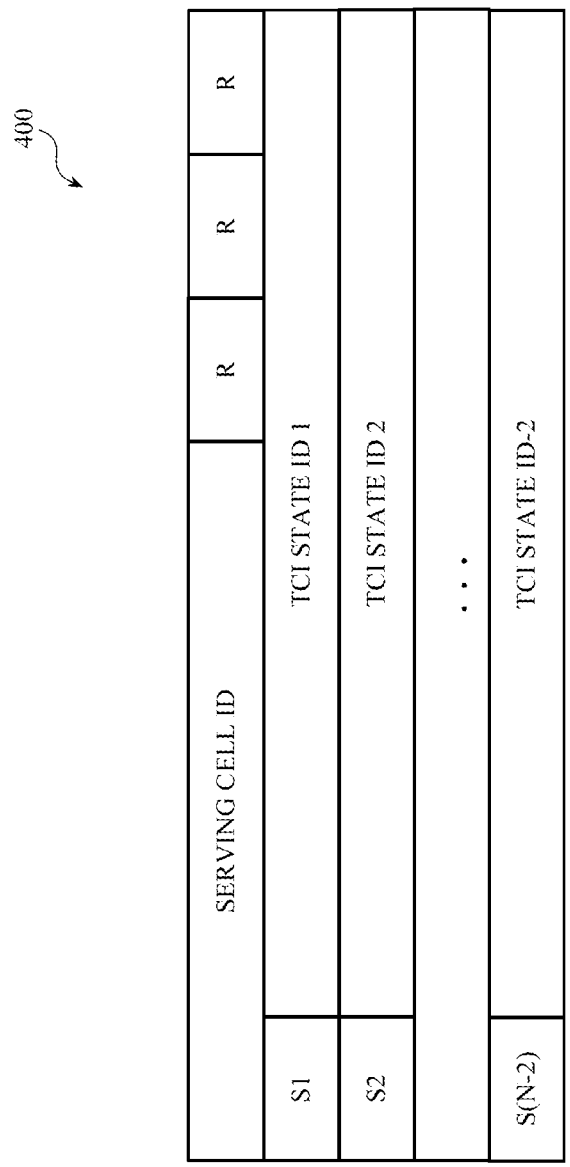
FIG. 4 is a diagram of an example of a MAC CE comprising TCI states associated with PC parameter sets.

FIG. 4 is a diagram of an example of another MAC CE 400 comprising TCI states associated with PC parameter sets. In some implementations, base station 122 may configure N (where N is greater than or equal to 1, e.g., N=2) PC parameter sets for a unified uplink/joint TCI state via RRC signaling. Base station 122 may configure N (where N is greater than or equal to 1, e.g., N=2) PC parameter sets for a unified uplink/joint TCI state via RRC signaling. In some implementations, this may include base station 122 sending MAC CE 400 to UE 110. As shown, MAC CE 400 may be arranged in octets (e.g., OCT 1, OCT 2, etc.). A first octet may include a serving cell ID and one or more reserved fields (R). Subsequent octets may include a PC parameter set index (or ID) and a corresponding TCI state ID. As such, Oct. 2 may include PC parameter set index S1 and TCI state ID 1, Oct 2 may include PC parameter set index S2 and TCI State ID 2, and so on to Oct. N. As such, UE 110 may use MAC CE 400 to determine a PC parameter set associated with a TCI state. So if, for example, TCI state 1 were activated, UE 110 could determine that PC parameter set SI should be used.

In some implementations, PC parameter set selection may be configured per PUCCH resource or per PUCCH resource group. A MAC CE based operation may be applied for PUCCH and/or configured grant based PUSCH. Alternatively, a MAC CE based operation may be applied for all uplink channels to which a unified TCI is applied (e.g., to a PUCCH, a PUSCH and an SRS for serving cells within a band or a band group). In some scenarios, before the MAC CE is received, UE 110 may transmit uplink signals based on a first or second PC parameter set in a list or index of PC parameter sets previously received by UE 110 (see, e.g., MAC CE 300 or 400). Additionally, or alternatively, before the MAC CE is received, UE 110 may transmit uplink signals based on a default PC parameter set (e.g., PC parameter set configured to be used in certain situations, such as the absence of instructions to do otherwise). Additionally, if only one PC parameter set is configured for the TCI, UE 110 may use the PC parameter set to transmit uplink signals, such that an additional field may not be present in the MAC CE.

Figure 5:
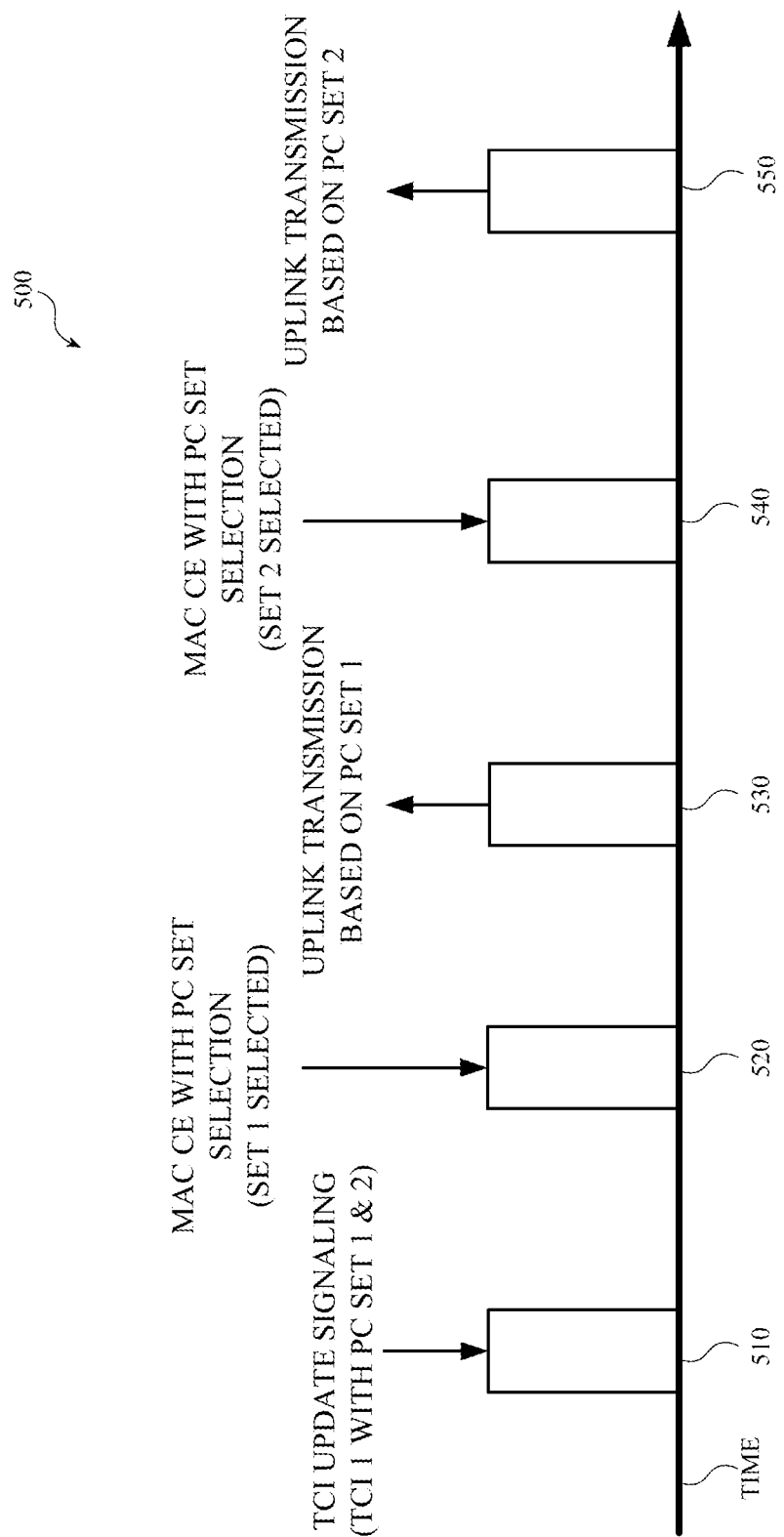
FIG. 5 is a diagram of an example of a process for performing uplink transmissions in accordance with PC parameter sets selected via MAC CE.

FIG. 5 is a diagram of an example of a process 500 for performing uplink transmissions in accordance with PC parameter sets selected via MAC CE. As shown, process 500 may include downlink events 510, 520, and 540, and uplink events 530 and 550 along a timeline. A downlink event may include a transmission from a base station 122 to a UE 110, while an uplink event may include a transmission from UE 110 to base station 122. Additionally, process 500 may include one or more fewer, additional, differently ordered and/or arranged operations than those shown in FIG. 5. In some implementations, some or all of the operations of process 500 may be performed independently, successively, simultaneously, etc., of one or more of the other operations of process 500.

At event 510, UE 110 may receive TCI update signaling indicating TCI state 1 with PC parameter set 1 PC parameter set 2. At event 520, UE 110 may receive a MAC CE with a PC set selection indicating PC parameter set 1. Each PC parameter set may indicate a subset of, or all, the PC parameters including P0, alpha, CL-PI, PL-RS, etc. At event 530, UE 110 may provide an uplink transmission based on PC parameter set 1. Later, at event 540, UE 110 may receive a MAC CE with a different PC parameter set selection indicating PC parameter set 2. At event 530, UE 110 may provide an uplink transmission based on PC parameter set 2. As such, base station 122 may provide TCI update signaling that include one or more TCI states and one or more PC parameter sets, and then select different PC parameter sets using MAC CEs.

Figure 6:
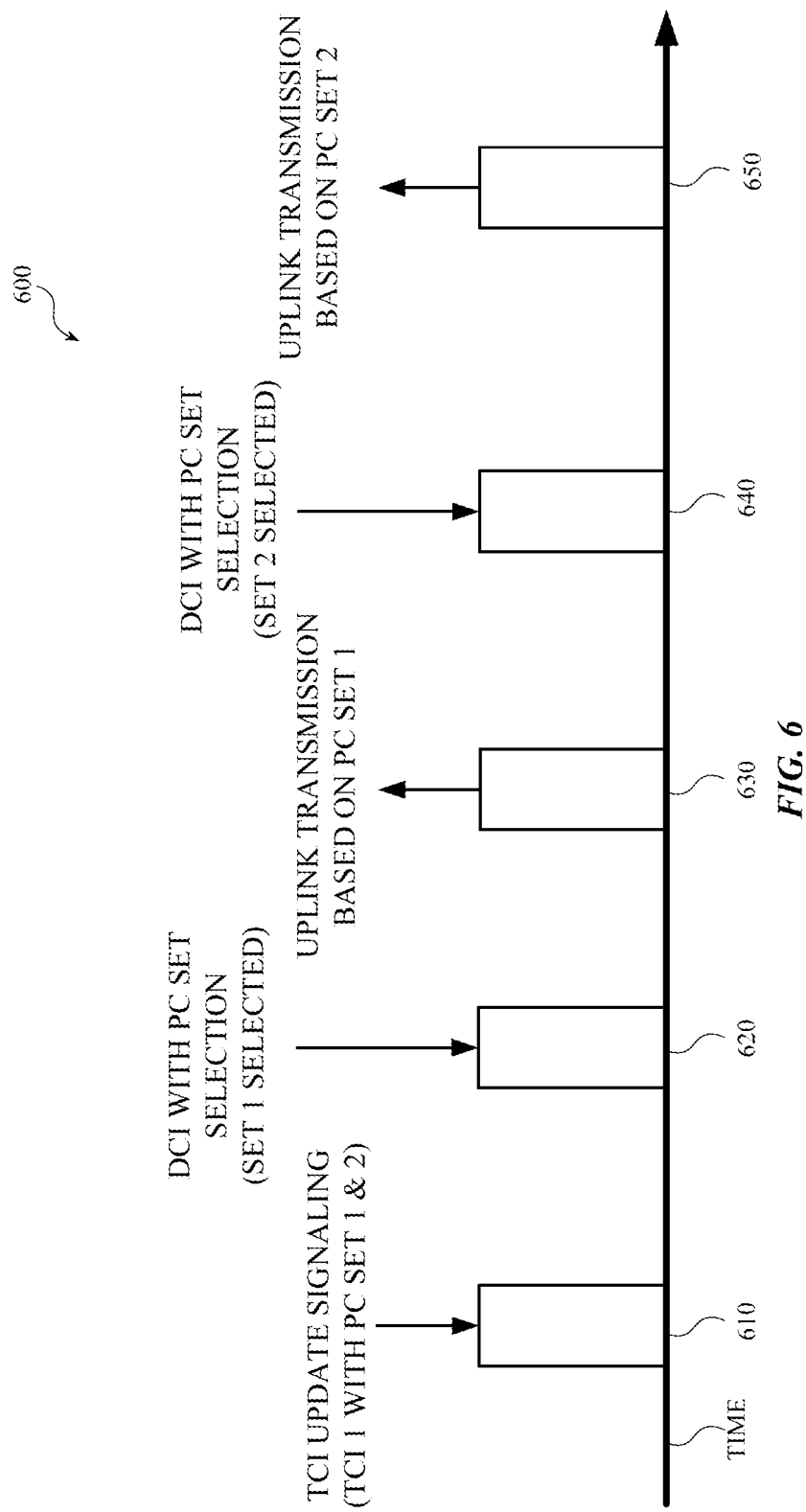
FIG. 6 is a diagram of an example of a process for performing uplink transmissions in accordance with PC parameter sets selected via downlink control information.

FIG. 6 is a diagram of an example of a process 600 for performing uplink transmissions in accordance with PC parameter sets selected via DCI. As shown, process 600 may include downlink events 610, 620, and 640, and uplink events 630 and 650 along a timeline. A downlink event may include a transmission from a base station 122 to a UE 110, while an uplink event may include a transmission from UE 110 to base station 122. Additionally, process 600 may include one or more fewer, additional, differently ordered and/or arranged operations than those shown in FIG. 6. In some implementations, some or all of the operations of process 600 may be performed independently, successively, simultaneously, etc., of one or more of the other operations of process 600.

At event 610, UE 110 may receive TCI update signaling indicating TCI state 1 with PC parameter set 1 PC parameter set 2. At event 620, UE 110 may receive DCI with a PC set selection indicating PC parameter set 1, and at event 630, UE 110 may provide an uplink transmission based on PC parameter set 1. Later, at event 640, UE 110 may receive DCI with a different PC parameter set selection indicating PC parameter set 2, and at event 630, UE 110 may provide an uplink transmission based on PC parameter set 2. As such, base station 122 may provide TCI update signaling that include one or more TCI states and one or more PC parameter sets, and then select different PC parameter sets using DCI.

In some implementations, PC parameter set selection may be indicated in the DCI used for a TCI update, e.g., DCI format 1_1 or DCI format 1_2. The PC parameter set may indicate a subset of, or all, the PC parameters including P0, alpha, CL-PI and PL-RS. In some implementations, an additional field may be added to the DCI format to indicate the PC parameter set selection. In some implementations, if only one PC parameter set is associated with the TCI, an additional field may not be present. In some implementations, an existing field, e.g., a TCI state field, may be extended to support PC parameter set selection. In some implementations, a starting control channel element (CCE) index can be used for PC parameter set selection. In such implementations, in one example, an odd CCE index may indicate a first PC parameter set and an even CCE index may indicates a second PC parameter set. In some implementations, a new type of cell radio network temporary ID (C-RNTI), e.g., a power control (PC) C-RNTI may be used to enable PC parameter set selection. In such scenarios, for example, whether to use a first PC parameter set or a second PC parameter se may be determined by the type of C-RNTI associated with the PDCCH being used.

In some implementations, PC parameter set selection may be indicated by scheduling DCI for PUCCH or PUSCH. The PC parameter set may indicate a subset of, or all, the PC parameters including P0, alpha, CL-PI, PL-RS, etc. In some implementations, this may be performed for every PUCCH and PUSCH. Alternatively, this may be performed for a scheduled PUCCH or PUSCH. For example, for the PUCCH and/or PUSCH, DCI format 1_1 or 1_2 may be enhanced to enable PC parameter set selection by introducing a new field, by extending an existing field (such as the TCI state field), using the CCE index, or introducing a new type of C-RNTI (e.g., a PC-C-RNTI).

In some implementations, PC parameter set selection may be indicated in a group-cast DCI. The PC parameter set may indicate a subset of, or all, the PC parameters including P0, alpha, CL-PI, PL-RS, etc. In such implementations, a radio network temporary ID (RNTI) for the DCI may be configured via RRC signaling and/or the DI may include a PC parameter set selection for multiple UEs 110, where field indexes for UE 110 may be configured by RRC signaling. In some implementations, PC parameter set selection may be performed by RRC signaling, which may be applicable to a configured grant (CG) PUSCH (CG-PUSH) scenario. The PC parameter set may indicate a subset of, or all, the PC parameters including P0, alpha, CL-PI, PL-RS, etc.

Figure 7:
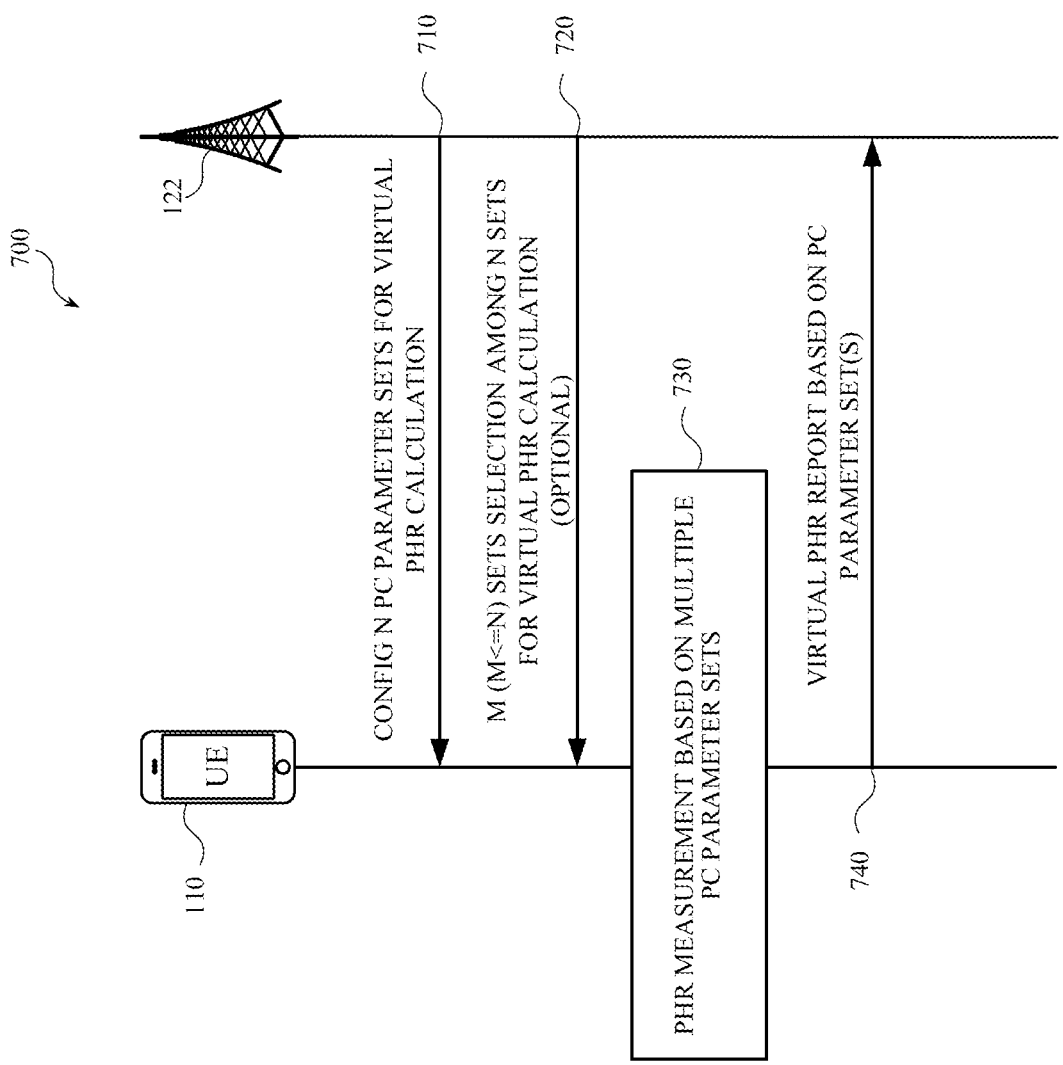
FIG. 7 is a diagram of an example of a process for reporting power headroom (PHR) based on PC parameter sets.

FIG. 7 is a diagram of an example 700 of reporting PHR based on PC parameter sets. As shown, example 700 includes UE 110 and base station 122. In some implementations, some or all of example 700 may be performed by one or more other systems or devices, including one or more of the devices of FIG. 1. Additionally, example 700 may include one or more fewer, additional, differently ordered and/or arranged operations than those shown in FIG. 7. In some implementations, some or all of the operations of example 700 may be performed independently, successively, simultaneously, etc., of one or more of the other operations of example 700. As such, the techniques described herein are not limited to a number, sequence, arrangement, timing, etc., of the operations or process depicted in FIG. 7.

As shown, base station 122 may communicate configuration information to UE 110 at 710). The configuration information may include a number (N) of PC parameter sets for virtual PHR calculation. The configuration information may also, or alternatively, include the actual PC parameter sets (e.g., the PC parameters comprising each PC parameter set). In some implementations, the PC parameter sets may be default PC parameter sets designated for virtual PHR reports. Additionally, or alternatively, the PC parameter sets, for the PHR report, may be configured by higher layer signaling (e.g., via RRC signaling, a MAC CE, DCI, etc.).

In some implementations, base station 122 may also communicate to UE 110 a number (M, where M is less than or equal to N) of PC parameter sets selected for virtual PHR calculation (at 720). Base station 122 may also, or alternatively, indicate which PC parameter sets are selected. The PC parameter sets selected may be from among the PC parameter sets provided by base station 122. UE 110 may perform a PHR measurement procedure based on the PC parameter sets selected by UE 110 (at 730). In some implementations, UE 110 may also, or alternatively, perform a PHR measurement procedure based on the N (e.g., default) PC parameter sets. UE 110 may also generate a virtual PHR report (based on the PC parameter sets selected (e.g., N or M)) and may provide the virtual PHR report to base station 122 (at 740).

Figure 8:
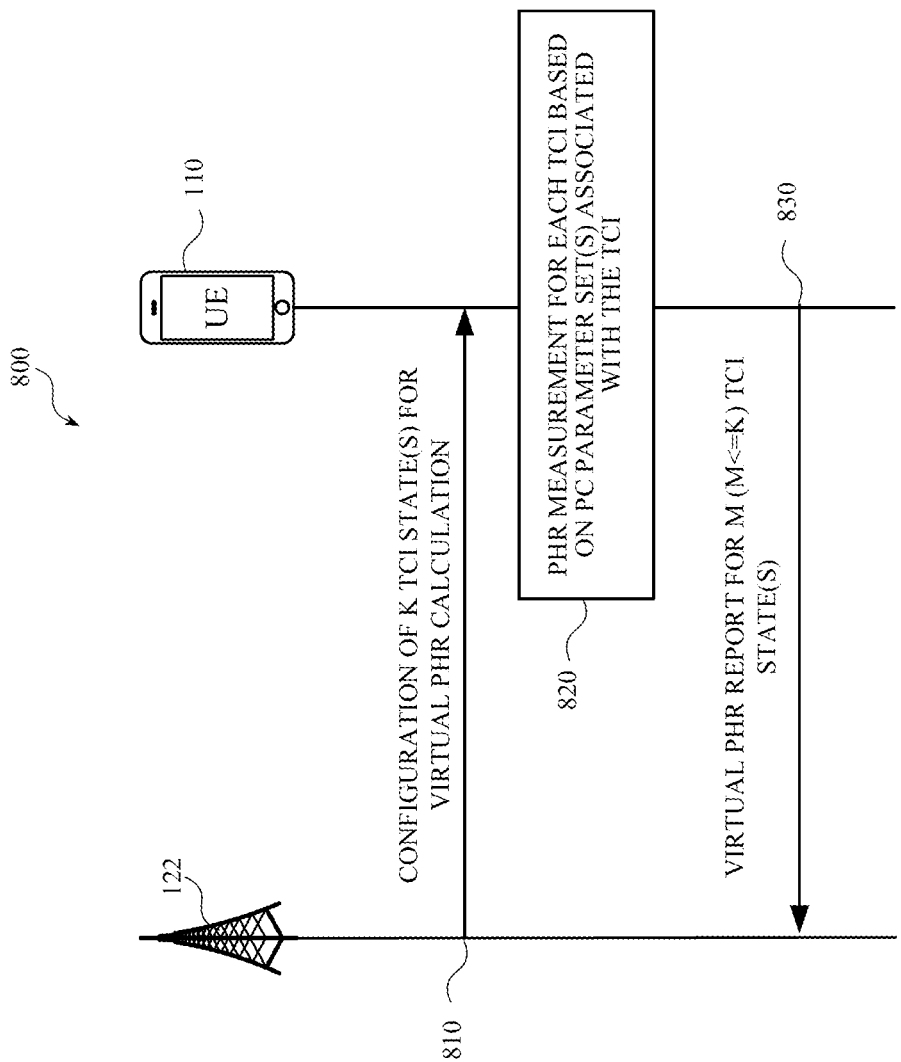
FIG. 8 is a diagram of an example of another process for performing uplink transmissions in accordance with PC parameter sets selected via downlink control information.

FIG. 8 is a diagram of an example of another process for performing uplink transmissions in accordance with PC parameter sets selected via downlink control information. As shown, example 800 includes UE 110 and base station 122. In some implementations, some or all of example 800 may be performed by one or more other systems or devices, including one or more of the devices of FIG. 1. Additionally, example 800 may include one or more fewer, additional, differently ordered and/or arranged operations than those shown in FIG. 8. In some implementations, some or all of the operations of example 800 may be performed independently, successively, simultaneously, etc., of one or more of the other operations of example 800. As such, the techniques described herein are not limited to a number, sequence, arrangement, timing, etc., of the operations or process depicted in FIG. 8.

Base station 122 may communicate configuration information corresponding to a number (K) of TCI states for virtual PHR calculations (at 810). The TCI states may be configured by higher layer signaling (e.g., via RRC signaling, a MAC CE, DCI, etc.). UE 110 may perform a PHR measurement for each TCI based on the PC parameter set(s) associated with the TCI (at 820). When more than one PC parameter set is associated with a TCI state, the PC parameter sets for the TCI state, for the PHR report, may be configured by higher layer signaling. Additionally, or alternatively, one or more default PC parameter sets may be applied to a TCI state. UE 110 may provide base station 122 with virtual PHR reports for a number (M, where M less than or equal to K) of the unified TCI states (at 830). M may be configured by higher layer signaling (e.g., via RRC signaling, a MAC CE, DCI, etc.).

Figure 9:
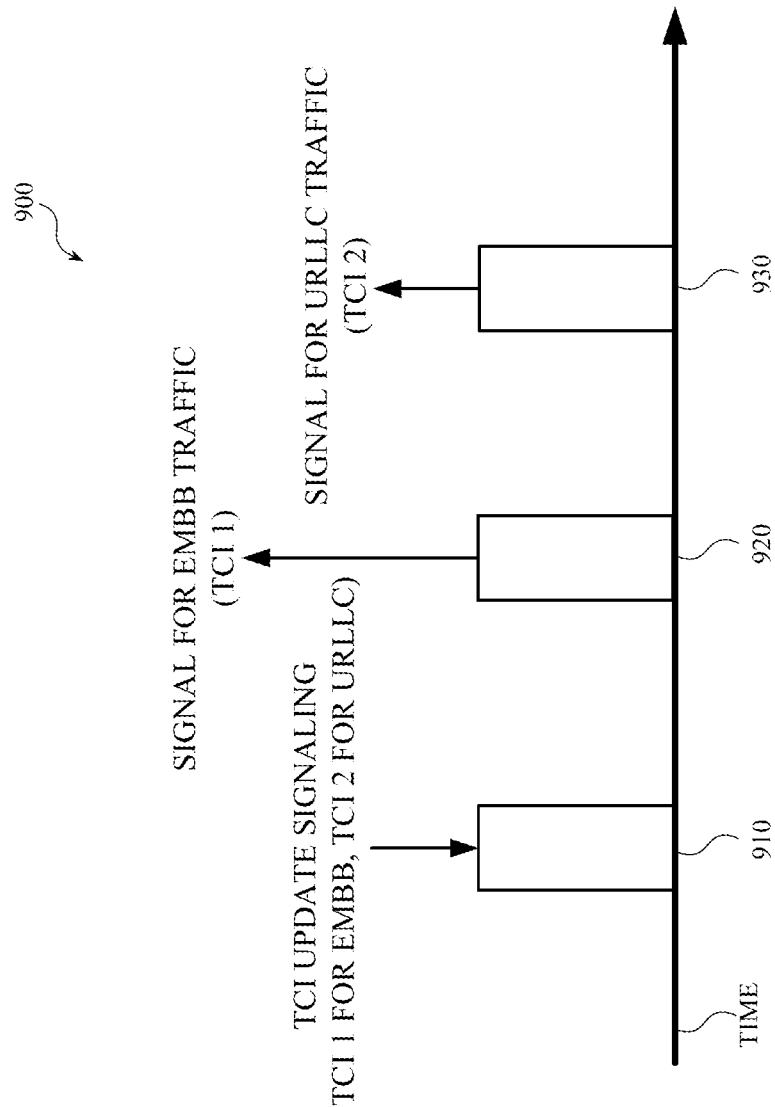
FIG. 9 is a diagram of an example of a process for performing uplink transmissions in accordance with PC parameter sets associated with uplink traffic types.

FIG. 9 is a diagram of an example of a process for performing uplink transmissions in accordance with PC parameter sets associated with uplink traffic types. As shown, process 900 may include downlink event 910, and uplink events 920 and 930 along a timeline. A downlink event may include a transmission from a base station 122 to a UE 110, while an uplink event may include a transmission from UE 110 to base station 122. Additionally, process 900 may include one or more fewer, additional, differently ordered and/or arranged operations than those shown in FIG. 9. In some implementations, some or all of the operations of process 900 may be performed independently, successively, simultaneously, etc., of one or more of the other operations of process 900.

With regard to beam specific power backoff and different PC parameter parameters for different traffic types, different beams may be better suited for different types of traffic. For example, URLLC traffic may utilize a higher transmission power than eMBB traffic. Additionally, URLLC traffic may be more likely to achieve a maximum transmission power limit compared to eMBB traffic. As such, with regard to beam specific power backoff, different beams may be better suited for URLLC traffic and eMBB traffic.

At event 910, UE 110 may receive TCI update signaling may indicating TCI state 1 for eMBB traffic and TCI state 2 for URLLC traffic. In some implementations, base station 122 may indicate multiple active unified TCI states via DCI. In some implementations, TCI states associated with traffic types may be indicated jointly (e.g., in a single field) of a TCI state indication. Alternatively, a new TCI field may be used to indicate beam selection for URLLC, and a legacy TCI field can be used for beam selection for eMBB. Alternatively, the beam selection for URLLC and eMBB may be indicated by separate DCIs, which may be distinguished by the types of RNTI, or a field indicated in the DCI.

At event 920, UE 110 may use, in accordance with the configuration information received via event 910, TCI state 1 to uplink eMMB traffic to base station 122. Similarly, at event 920, UE may use TCI state 2 to uplink URLLC traffic to base station 122. As such, base station 122 may provide TCI update signaling that include one or more TCI states, which may be associated with different PC parameter sets, associated with different types of traffic.

In an additional, or alternative, implementation, base station 122 may activate unified TCI states via MAC CE for a TCI codepoint in DCI, and each TCI may be used for certain types of traffic. For example, base station may indicate two TCI states to UE 110, where a first TCI state is used for eMBB traffic, and a second TCI state is used for URLLC traffic. The uplink channel with each type of traffic may use to the TCI state associated with the traffic type, which may be configured via higher layer signaling (e.g., via RRC signaling, a MAC CE, DCI, etc.).

Figure 10:
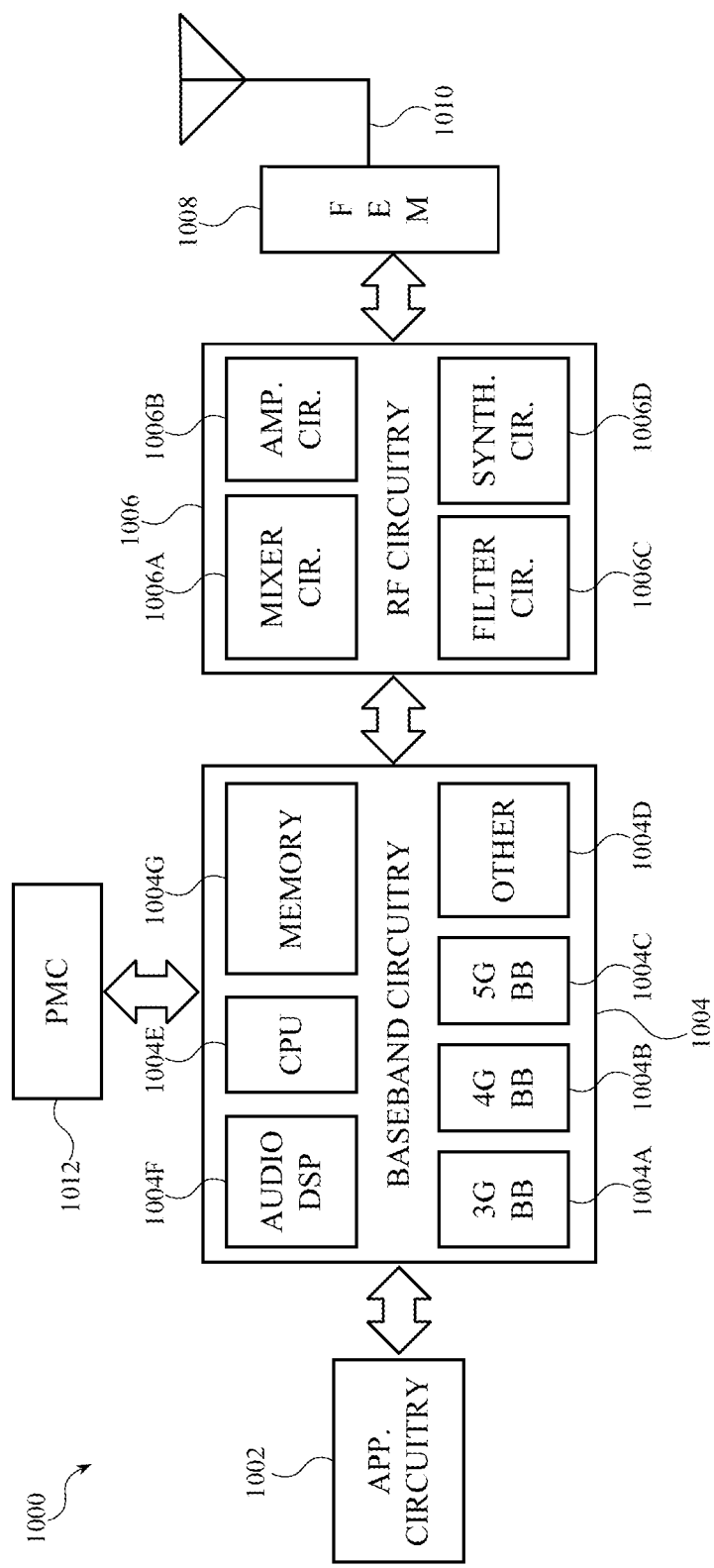
FIG. 10 is a diagram of an example of components of a device according to one or more implementations described herein.

FIG. 10 is a diagram of an example of components of a device according to one or more implementations described herein. In some implementations, the device 1000 can include application circuitry 1002, baseband circuitry 1004, RF circuitry 1006, front-end module (FEM) circuitry 1008, one or more antennas 1010, and power management circuitry (PMC) 1012 coupled together at least as shown. The components of the illustrated device 1000 can be included in a UE or a RAN node. In some implementations, the device 1000 can include fewer elements (e.g., a RAN node may not utilize application circuitry 1002, and instead include a processor/controller to process IP data received from a CN such as 5GC 130 or an Evolved Packet Core (EPC)). In some implementations, the device 1000 can include additional elements such as, for example, memory/storage, display, camera, sensor (including one or more temperature sensors, such as a single temperature sensor, a plurality of temperature sensors at different locations in device 1000, etc.), or input/output (I/O) interface. In other implementations, the components described below can be included in more than one device (e.g., said circuitries can be separately included in more than one device for Cloud-RAN (C-RAN) implementations).

The application circuitry 1002 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/ storage to enable various applications or operating systems to run on the device 1000. In some implementations, processors of application circuitry 1002 can process IP data packets received from an EPC.

The baseband circuitry 1004 can include circuitry such as, but not limited to, one or more single-core or multi-core processors. The baseband circuitry 1004 can include one or more baseband processors or control logic to process baseband signals received from a receive signal path of the RF circuitry 1006 and to generate baseband signals for a transmit signal path of the RF circuitry 1006. Baseband circuitry 1004 can interface with the application circuitry 1002 for generation and processing of the baseband signals and for controlling operations of the RF circuitry 1006. For example, in some implementations, the baseband circuitry 1004 can include a 3G baseband processor 1004A, a 4G baseband processor 1004B, a 5G baseband processor 1004C, or other baseband processor(s) 1004D for other existing generations, generations in development or to be developed in the future (e.g., 2G, 6G, etc.). The baseband circuitry 1004 (e.g., one or more of baseband processors 1004A-D) can handle various radio control functions that enable communication with one or more radio networks via the RF circuitry 1006. In other implementations, some or all of the functionality of baseband processors 1004A-D can be included in modules stored in the memory 1004G and executed via a Central Processing Unit (CPU) 1004E. The radio control functions can include, but are not limited to, signal modulation/demodulation, encoding/decoding, radio frequency shifting, etc. In some implementations, modulation/demodulation circuitry of the baseband circuitry 1004 can include Fast-Fourier Transform (FFT), precoding, or constellation mapping/de-mapping functionality. In some implementations, encoding/decoding circuitry of the baseband circuitry 1004 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1004 can include one or more audio digital signal processor(s) (DSP) 1004F. The audio DSPs 1004F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1004 and the application circuitry 1002 can be implemented together such as, for example, on a system on a chip (SOC).

In some implementations, the baseband circuitry 1004 can provide for communication compatible with one or more radio technologies. For example, in some implementations, the baseband circuitry 1004 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1004 is configured to support radio communications of more than one wireless protocol can be referred to as multi-mode baseband circuitry.

RF circuitry 1006 can enable communication with wireless networks using modulated electromagnetic radiation through a non-solid medium. In various implementations, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some implementations, the receive signal path of the RF circuitry 1006 can include mixer circuitry 1006A, amplifier circuitry 1006B and filter circuitry 1006C. In some implementations, the transmit signal path of the RF circuitry 1006 can include filter circuitry 1006C and mixer circuitry 1006A. RF circuitry 1006 can also include synthesizer circuitry 1006D for synthesizing a frequency for use by the mixer circuitry 1006A of the receive signal path and the transmit signal path. In some implementations, the mixer circuitry 1006A of the receive signal path can be configured to down-convert RF signals received from the FEM circuitry 1008 based on the synthesized frequency provided by synthesizer circuitry 1006D. The amplifier circuitry 1006B can be configured to amplify the down-converted signals and the filter circuitry 1006C can be a low-pass filter (LPF) or band-pass filter (BPF) configured to remove unwanted signals from the down-converted signals to generate output baseband signals. Output baseband signals can be provided to the baseband circuitry 1004 for further processing. In some implementations, the output baseband signals can be zero-frequency baseband signals, although this is not a requirement. In some implementations, mixer circuitry 1006A of the receive signal path can comprise passive mixers, although the scope of the implementations is not limited in this respect.

In some implementations, the mixer circuitry 1006A of the transmit signal path can be configured to up-convert input baseband signals based on the synthesized frequency provided by the synthesizer circuitry 1006D to generate RF output signals for the FEM circuitry 1008. The baseband signals can be provided by the baseband circuitry 1004 and can be filtered by filter circuitry 1006C.

In some implementations, the mixer circuitry 1006A of the receive signal path and the mixer circuitry 1006A of the transmit signal path can include two or more mixers and can be arranged for quadrature down conversion and up conversion, respectively. In some implementations, the mixer circuitry 1006A of the receive signal path and the mixer circuitry 1006A of the transmit signal path can include two or more mixers and can be arranged for image rejection (e.g., Hartley image rejection). In some implementations, the mixer circuitry 1006A of the receive signal path and the mixer circuitry 1006A can be arranged for direct down conversion and direct up conversion, respectively. In some implementations, the mixer circuitry 1006A of the receive signal path and the mixer circuitry 1006A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1006 can include analog-to-digital converter (ADC) and digital-to-analog converter (DAC) circuitry and the baseband circuitry 1004 can include a digital baseband interface to communicate with the RF circuitry 1006.

In some dual-mode implementations, a separate radio IC circuitry can be provided for processing signals for each spectrum, although the scope of the implementations is not limited in this respect.

In some implementations, the synthesizer circuitry 1006D can be a fractional-N synthesizer or a fractional N/N+1 synthesizer, although the scope of the implementations is not limited in this respect as other types of frequency synthesizers can be suitable. For example, synthesizer circuitry 1006D can be a delta-sigma synthesizer, a frequency multiplier, or a synthesizer comprising a phase-locked loop with a frequency divider.

The synthesizer circuitry 1006D can be configured to synthesize an output frequency for use by the mixer circuitry 1006A of the RF circuitry 1006 based on a frequency input and a divider control input. In some implementations, the synthesizer circuitry 1006D can be a fractional N/N+1 synthesizer.

In some implementations, frequency input can be provided by a voltage controlled oscillator (VCO), although that is not a requirement. Divider control input can be provided by either the baseband circuitry 1004 or the applications circuitry 1002 depending on the desired output frequency. In some implementations, a divider control input (e.g., N) can be determined from a look-up table based on a channel indicated by the applications circuitry 1002.

Synthesizer circuitry 1006D of the RF circuitry 1006 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1006D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1006 can include an IQ/polar converter.

FEM circuitry 1008 can include a receive signal path which can include circuitry configured to operate on RF signals received from one or more antennas 1010, amplify the received signals and provide the amplified versions of the received signals to the RF circuitry 1006 for further processing. FEM circuitry 1008 can also include a transmit signal path which can include circuitry configured to amplify signals for transmission provided by the RF circuitry 1006 for transmission by one or more of the one or more antennas 1010. In various implementations, the amplification through the transmit or receive signal paths can be done solely in the RF circuitry 1006, solely in the FEM circuitry 1008, or in both the RF circuitry 1006 and the FEM circuitry 1008.

In some implementations, the FEM circuitry 1008 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1006). The transmit signal path of the FEM circuitry 1008 can include a power amplifier (PA) to amplify input RF signals (e.g., provided by RF circuitry 1006), and one or more filters to generate RF signals for subsequent transmission (e.g., by one or more of the one or more antennas 1010).

In some implementations, the PMC 1012 can manage power provided to the baseband circuitry 1004. In particular, the PMC 1012 can control power-source selection, voltage scaling, battery charging, or DC-to-DC conversion. The PMC 1012 can often be included when the device 1000 is capable of being powered by a battery, for example, when the device is included in a UE. The PMC 1012 can increase the power conversion efficiency while providing desirable implementation size and heat dissipation characteristics.

While FIG. 10 shows the PMC 1012 coupled only with the baseband circuitry 1004. However, in other implementations, the PMC 1012 may be additionally or alternatively coupled with, and perform similar power management operations for, other components such as, but not limited to, application circuitry 1002, RF circuitry 1006, or FEM circuitry 1008.

In some implementations, the PMC 1012 can control, or otherwise be part of, various power saving mechanisms of the device 1000. For example, if the device 1000 is in an RRC_Connected state, where it is still connected to the RAN node as it expects to receive traffic shortly, then it can enter a state known as Discontinuous Reception Mode (DRX) after a period of inactivity. During this state, the device 1000 can power down for brief intervals of time and thus save power.

If there is no data traffic activity for an extended period of time, then the device 1000 can transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1002 and processors of the baseband circuitry 1004 can be used to execute elements of one or more instances of a protocol stack. For example, processors of the baseband circuitry 1004, alone or in combination, can be used execute Layer 3, Layer 2, or Layer 1 functionality, while processors of the baseband circuitry 1004 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 11:
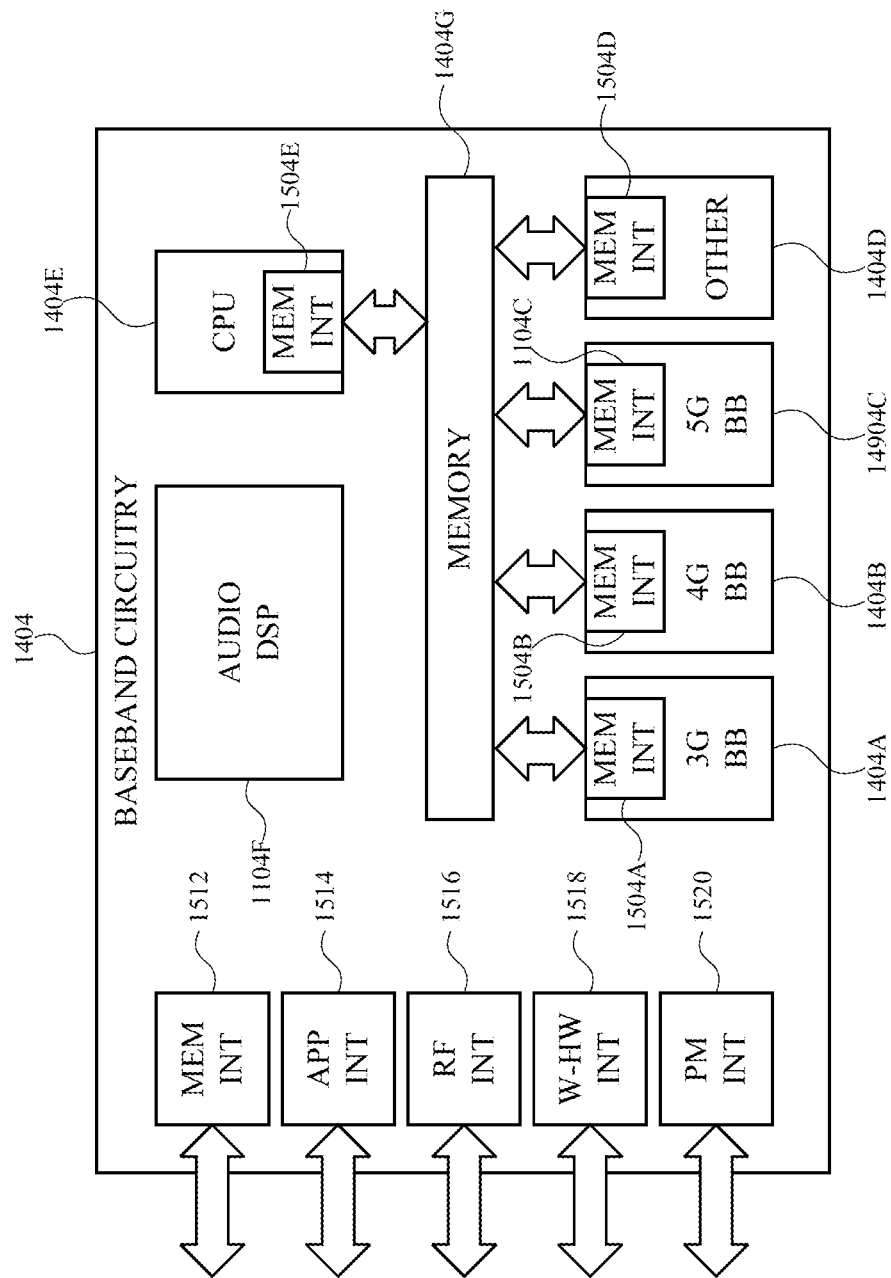
FIG. 11 is a diagram of example interfaces of baseband circuitry according to one or more implementations described herein.

FIG. 11 is a diagram of example interfaces of baseband circuitry according to one or more implementations described herein. As discussed above, the baseband circuitry 1004 of FIG. 10 can comprise processors 1004A-1004E and a memory 1004G utilized by said processors. Each of the processors 1004A-1004E can include a memory interface, 1104A-1104E, respectively, to send/receive data to/from the memory 1004G.

The baseband circuitry 1004 can further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a baseband processor of a user equipment (UE) may comprise one or more processors configured to receive transmission configuration indicator (TCI) signaling comprising a plurality of power control (PC) parameter sets, wherein each PC parameter set, of the plurality of PC parameter sets, comprises a distinct plurality of PC parameters; determine a PC parameter set, of the plurality of PC parameter sets, for an uplink transmission based on a condition associated with the PC parameter set; and perform the uplink transmission in accordance with the selected PC parameter set. In example 2, more than one PC parameter set, of the plurality of PC parameter sets, are associated with a TCI state. In example 3, a default PC parameter set is used for uplink transmissions involving a TCI state not associated with any of the plurality of PC parameter sets.

In example 4, the condition is associated with the PC parameter set is configured by comprises reception of a media access control (MAC) control element (CE) for TCI activation. In example 5, the condition comprises reception of a MAC CE indicating the PC parameter set. In example 6, the condition comprises use of a physical uplink control channels (PUCCH) or PUCCH group. In example 7, the condition comprises reception of a downlink control information (DCI) indicating the PC parameter set for uplink transmission.

In example 8, the condition comprises reception of scheduling DCI, for a physical uplink channel, indicating the PC parameter set for the uplink transmission. In example 9, the condition comprises reception of group-cast DCI indicating the PC parameter set for the uplink transmission. In example 10, the condition comprises reception of radio resource control (RRC) signaling indicating the PC parameter set for the uplink transmission. In example 11, the condition comprises providing a virtual power headroom (PHR) report via the uplink transmission. In example 12, the PHR report is based on unified TCI states configured by higher layer signaling. In example 13, wherein the condition comprises a traffic type associated with a TCI state of the uplink transmission, and the TCI state is associated with the PC parameter set. In example 14, the traffic type comprises enhanced mobile broadband (eMBB) traffic associated with the TCI state via DCI. In example 15, the traffic type comprises ultra-reliable low-latency communication (URLLC) traffic and URLLC is associated with the TCI state via DCI.

In example 16, which may also include one or more of the examples described herein, a user equipment (UE) may be configured to receive transmission configuration indicator (TCI) signaling comprising a plurality of power control (PC) parameter sets, wherein each PC parameter set, of the plurality of PC parameter sets, comprises a distinct plurality of PC parameters; determine a PC parameter set, of the plurality of PC parameter sets, for an uplink transmission based on a condition associated with the PC parameter set; and perform the uplink transmission in accordance with the selected PC parameter set.

In example 17, which may also include one or more of the examples described herein, a method performed by a user equipment (UE) may comprise: receiving transmission configuration indicator (TCI) signaling comprising a plurality of power control (PC) parameter sets, wherein each PC parameter set, of the plurality of PC parameter sets, comprises a distinct plurality of PC parameters; determining a PC parameter set, of the plurality of PC parameter sets, for an uplink transmission based on a condition associated with the PC parameter set; and performing the uplink transmission in accordance with the selected PC parameter set.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor for a user equipment (UE), the baseband processor configured to, when executing instructions stored in a memory, perform operations comprising:
    receiving signaling to configure a plurality of power control (PC) parameter sets, wherein each PC parameter set of the plurality of PC parameter sets comprises a distinct plurality of PC parameters;
    receiving a groupcast downlink control information (DCI) with a field indicating a PC parameter set from the plurality of PC parameter sets;
    performing an uplink transmission based on the PC parameter set indicated in the field of the groupcast DCI;
    receiving a subsequent DCI for a transmission configuration indicator (TCI) state update, the subsequent DCI indicating a second PC parameter set of the plurality of PC parameter sets, wherein the subsequent DCI includes an additional field to indicate the second PC parameter set when more than one PC parameter set is associated with the updated TCI state, and wherein the additional field is not present when only one PC parameter set is associated with the updated TCI state; and
    performing a subsequent uplink transmission using the updated TCI state based on the second PC parameter set indicated in the subsequent DCI.

2. The baseband processor of claim 1, wherein one or more PC parameter sets of the plurality of PC parameter sets are associated with one or more respective TCI states.

3. The baseband processor of claim 2, wherein a default PC parameter set is used for uplink transmissions involving a TCI state not associated with any of the plurality of PC parameter sets.

4. The baseband processor of claim 1, wherein the operations further comprise:
    receiving an indication of a number of PC parameter sets selected for virtual power headroom (PHR) calculation, wherein the number of PC parameter sets selected for the virtual PHR calculation is less than or equal to a total number of PC parameter sets in the plurality of PC parameter sets; and
    generating a virtual PHR report based on the PC parameter sets selected for the virtual PHR calculation.

5. The baseband processor of claim 4, wherein the operations further comprise:
    receiving an indication of which PC parameter sets are selected for the virtual PHR calculation from the plurality of PC parameter sets, wherein generating the virtual PHR report is further based on which PC parameter sets are selected for the virtual PHR calculation.

6. The baseband processor of claim 1, wherein the groupcast DCI indicates a PC parameter selection for multiple UEs, and wherein the operations further comprise:
    receiving radio resource control (RRC) signaling to configure a field index for the UE; and
    identifying the field of the groupcast DCI indicating the PC parameter set, based on the field index.

7. The baseband processor of claim 1, wherein a radio network temporary identifier (RNTI) for the DCI is configured via radio resource control (RRC) signaling.

8. The baseband processor of claim 1, wherein the operations further comprise:
    receiving a subsequent PC parameter set selection via radio resource control (RRC) signaling; and
    performing a subsequent uplink transmission based on the subsequent PC parameter set selection.

9. The baseband processor of claim 1, wherein the DCI for the TCI update includes a DCI format 1_1 or a DCI format 1_2.

10. The baseband processor of claim 1, wherein the PC parameter set in the subsequent DCI for the TCI update is indicated by a TCI state field in the subsequent DCI.

11. The baseband processor of claim 1, wherein the PC parameter set in the subsequent DCI for the TCI update is indicated by a control channel element (CCE) index in the subsequent DCI.

12. The baseband processor of claim 11, wherein an odd CCE index indicates a first PC parameter set, and wherein an even CCE index indicates a second PC parameter set.

13. A user equipment (UE) comprising:
    radio frequency (RF) circuitry; and
    a processor coupled to the RF circuitry and configured to execute instructions stored in a memory to cause the UE to:
    receive signaling to configure a plurality of power control (PC) parameter sets, wherein each PC parameter set of the plurality of PC parameter sets comprises a distinct plurality of PC parameters;
    receive a groupcast downlink control information (DCI) with a field indicating a PC parameter set from the plurality of PC parameter sets;
    perform an uplink transmission, via the RF circuitry, based on the PC parameter set indicated in the field of the groupcast DCI;

receive a subsequent DCI for a transmission configuration indicator (TCI) state update, the subsequent DCI indicating a second PC parameter set of the plurality of PC parameter sets, wherein the subsequent DCI includes an additional field to indicate the second PC parameter set when more than one PC parameter set is associated with the updated TCI state, and wherein the additional field is not present when only one PC parameter set is associated with the updated TCI state; and perform a subsequent uplink transmission using the updated TCI state based on the second PC parameter set indicated in the subsequent DCI.

14. The UE of claim 13, wherein the processor further causes the UE to: transmit a virtual power headroom (PHR) report via the uplink transmission.

15. The UE of claim 14, wherein the virtual PHR report is based on one or more unified TCI states configured by higher layer signaling.

16. The UE of claim 13, wherein one or more PC parameter sets of the plurality of PC parameter sets are associated with one or more respective TCI states.

17. The UE of claim 16, wherein a default PC parameter set is used for uplink transmissions involving a TCI state not associated with any of the plurality of PC parameter sets.

18. A method for a user equipment (UE), comprising:

receiving signaling to configure a plurality of power control (PC) parameter sets, wherein each PC parameter set of the plurality of PC parameter sets comprises a distinct plurality of PC parameters;

receiving a groupcast downlink control information (DCI) with a field indicating a PC parameter set from the plurality of PC parameter sets;

performing an uplink transmission based on the PC parameter set indicated in the field of the groupcast DCI;

receiving a subsequent DCI for a transmission configuration indicator (TCI) state update, the subsequent DCI indicating a second PC parameter set of the plurality of PC parameter sets, wherein the subsequent DCI includes an additional field to indicate the second PC parameter set when more than one PC parameter set is associated with the updated TCI state, and wherein the additional field is not present when only one PC parameter set is associated with the updated TCI state; and performing a subsequent uplink transmission using the updated TCI state based on the second PC parameter set indicated in the subsequent DCI.

* * * * *